United States Patent
Mukunoki et al.

(10) Patent No.: US 9,812,992 B2
(45) Date of Patent: Nov. 7, 2017

(54) POWER CONVERSION SYSTEM

(71) Applicants: Mitsubishi Electric Corporation, Chiyoda-ku (JP); Toshiba Mitsubishi-Electric Industrial Systems Corporation, Chuo-ku (JP)

(72) Inventors: Kaho Mukunoki, Chiyoda-ku (JP); Toshiyuki Fujii, Chiyoda-ku (JP); Osamu Mori, Chiyoda-ku (JP); Shinzo Tamai, Chuo-ku (JP); Sadao Funahashi, Chuo-ku (JP); Yasuhiko Hosokawa, Chuo-ku (JP); Kotaro Higashi, Chuo-ku (JP)

(73) Assignees: Mitsubishi Electric Corporation, Chiyoda-ku (JP); TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 15/109,594

(22) PCT Filed: Dec. 3, 2014

(86) PCT No.: PCT/JP2014/081951
§ 371 (c)(1),
(2) Date: Jul. 1, 2016

(87) PCT Pub. No.: WO2015/104922
PCT Pub. Date: Jul. 16, 2015

(65) Prior Publication Data
US 2016/0329831 A1 Nov. 10, 2016

(30) Foreign Application Priority Data
Jan. 9, 2014 (JP) ................. 2014-002069

(51) Int. Cl.
*H02M 7/48* (2007.01)
*H02M 7/77* (2006.01)
(Continued)

(52) U.S. Cl.
CPC ............. *H02M 7/68* (2013.01); *H02M 1/08* (2013.01); *H02M 7/48* (2013.01); *H02M 7/483* (2013.01);
(Continued)

(58) Field of Classification Search
CPC ..... H02M 7/48; H02M 2007/485; H02M 7/77
See application file for complete search history.

(56) References Cited

U.S. PATENT DOCUMENTS 5,285,029 A * 2/1994 Araki ................. B66B 5/027
187/290
8,576,593 B2 * 11/2013 Mori .................. H02M 1/4216
363/125

(Continued)

FOREIGN PATENT DOCUMENTS

| JP | 2011-182517 A | 9/2011 |
| JP | 2012-44839 A | 3/2012 |
| JP | 2013-27221 A | 2/2013 |
| JP | 2014-18028 A | 1/2014 |

OTHER PUBLICATIONS

Extended European Search Report issued Jul. 12, 2017 in Patent Application No. 14877686.7.
(Continued)

*Primary Examiner* — Timothy J Dole
*Assistant Examiner* — Ishrat Jamali
(74) *Attorney, Agent, or Firm* — Oblon, McClelland, Maier & Neustadt, L.L.P.

(57) ABSTRACT

In a power conversion system in which one or more converter cells are connected in series to form an arm for each phase, a control device includes a voltage command gener-
(Continued)

ating unit for generating a positive arm voltage command and a negative arm voltage command for each phase. The voltage command generating unit includes an AC current control unit, a circulating current control unit, and a command distributing unit. On the basis of inputted voltage commands, the command distributing unit subtracts voltage drop portions due to inductance values in the arms from respective voltages assigned as outputs of the positive arm and the negative arm, to distribute voltage components, thereby determining the positive arm voltage command and the negative arm voltage command.

11 Claims, 8 Drawing Sheets

(51) Int. Cl.
    *H02M 7/68*     (2006.01)
    *H02M 7/483*     (2007.01)
    *H02M 1/08*     (2006.01)
    *H02M 1/00*     (2006.01)

(52) U.S. Cl.
    CPC ...... *H02M 7/77* (2013.01); *H02M 2001/0009* (2013.01); *H02M 2001/0025* (2013.01); *H02M 2007/4835* (2013.01)

(56) References Cited

U.S. PATENT DOCUMENTS

| | | | |
|---|---|---|---|
| 9,564,827 B2* | 2/2017 | Mukunoki | H02M 7/483 |
| 9,712,084 B2* | 7/2017 | Kikuchi | H02M 7/53871 |
| 2012/0063136 A1* | 3/2012 | Ray | G09F 9/33 362/249.02 |
| 2012/0063178 A1* | 3/2012 | Fujita | H02M 5/4585 363/37 |
| 2012/0256601 A1 | 10/2012 | Korn | |
| 2016/0329831 A1* | 11/2016 | Mukunoki | H02M 7/483 |
| 2017/0047860 A1* | 2/2017 | Fujii | H02M 7/483 |

OTHER PUBLICATIONS

Daniel Siemaszko, et al., "Evaluation of Control and Modulation Methods for Modular Multilevel Converters" The 2010 International Power Electronics Conference, XP055066778, Jun. 2010, pp. 746-753.

International Search Report dated Mar. 3, 2015, in PCT/JP2014/081951 filed Dec. 3, 2014.

Makoto Hagiwara et al., Theoretical Analysis and Control of the Modular Multilevel Cascade Converter Based on Double-Star Chopper-Cells (MMCC-DSCC), Extended Summary, IEEJ Transactions D (on industry applications), vol. 131, No. 1, (2011), ( 2 pages).

* cited by examiner

POWER CONVERSION SYSTEM

TECHNICAL FIELD

The present invention relates to a power conversion system for performing power conversion between plural-phase AC and DC, and particularly, to a large-capacity power conversion system with multiplexed converters.

BACKGROUND ART

In large-capacity power conversion systems, the converter output is high voltage or large current, and therefore, many large-capacity power conversion systems are configured with a plurality of converters multiplexed in series or parallel. Multiplexing converters can not only increase the converter capacity, but also reduce harmonics contained in an output voltage waveform by synthesizing outputs, and as a result, can reduce harmonic current flowing to a grid.

As means for multiplexing converters, there is a multi-level converter in which outputs of a plurality of converters are connected in cascade, and one of such multilevel converters is a modular multilevel converter. Each arm of the modular multilevel converter is composed of a plurality of converter cells connected in cascade.

Each of a first arm and a second arm for each phase of the conventional modular multilevel converter has a chopper cell (converter cell) and a reactor. The chopper cell has two semiconductor switches connected in series to each other, and a DC capacitor connected in parallel thereto. In each of the first arm and the second arm, the same number of chopper cells are connected in cascade via their respective output terminals.

Control for each phase of the conventional modular multilevel converter includes: average value control for causing the average value of voltage values of all DC capacitors to follow a capacitor voltage command value; individual balance control for causing the voltage value of each DC capacitor to follow the capacitor voltage command value; and arm balance control for causing the average value of voltage values of all the DC capacitors in the first arm and the average value of voltage values of all the DC capacitors in the second arm to coincide with each other. A voltage command value is calculated so as to control circulating current which circulates in the modular multilevel converter without flowing to the outside of the modular multilevel converter, and to control AC current for each phase (for example, see Patent Document 1 and Non-Patent Document 1).

CITATION LIST

Patent Document

Patent Document 1: Japanese Laid-Open Patent Publication No. 2011-182517

Non-Patent Document

Non-Patent Document 1: IEEJ transactions D (on industry applications) Vol. 131, No. 1, 2011 (pages 84 to 92)

SUMMARY OF THE INVENTION

Problems to be Solved by the Invention

Such a power conversion system performs control under the assumption that the inductance values in a positive arm and a negative arm are equal to each other. Therefore, in the case where the reactors in the arms have different inductances or the case where a reactor is provided in only one of the arms, a problem arises that a plurality of current control systems interfere with each other and reliable control cannot be performed.

The present invention has been made to solve the above problem, and an object of the present invention is to provide a power conversion system capable of performing stable and reliable control even in the case where the positive arm and the negative arm have different inductance values.

Solution to the Problems

A power conversion system according to the present invention includes: a power converter for performing power conversion between plural-phase AC and DC, the power converter including a plurality of legs each having a positive arm and a negative arm connected in series, with a connection point therebetween connected to each phase AC line, the plurality of legs being connected in parallel between positive and negative DC buses; and a control device for controlling the power converter. Each of the positive arm and the negative arm of each leg is composed of one or a plurality of converter cells connected in series and including: a series unit of a plurality of semiconductor switching elements connected in series to each other; and a DC capacitor connected in parallel to the series unit, a terminal of the semiconductor switching element being used as an output terminal. The control device includes a voltage command generating unit for generating a first voltage command for the positive arm and a second voltage command for the negative arm, to perform output control for each converter cell in the positive arm and the negative arm. The voltage command generating unit includes: a current control unit for calculating control commands for controlling an AC current component flowing through each phase AC line, and a circulating current component for each phase which circulates between the legs; and a command distributing unit for, on the basis of the control commands and a DC voltage command value for voltage between the DC buses, subtracting voltage drop portions due to inductance values in the positive arm and the negative arm from voltages assigned as outputs of the positive arm and the negative arm, to determine the first voltage command and the second voltage command.

Effect of the Invention

In the power conversion system according to the present invention, even if the positive arm and the negative arm have different inductance values, the first voltage command for the positive arm and the second voltage command for the negative arm can be generated with high accuracy, whereby stable and reliable control can be performed.

DESCRIPTION OF EMBODIMENTS

Embodiment 1

Figure 1:
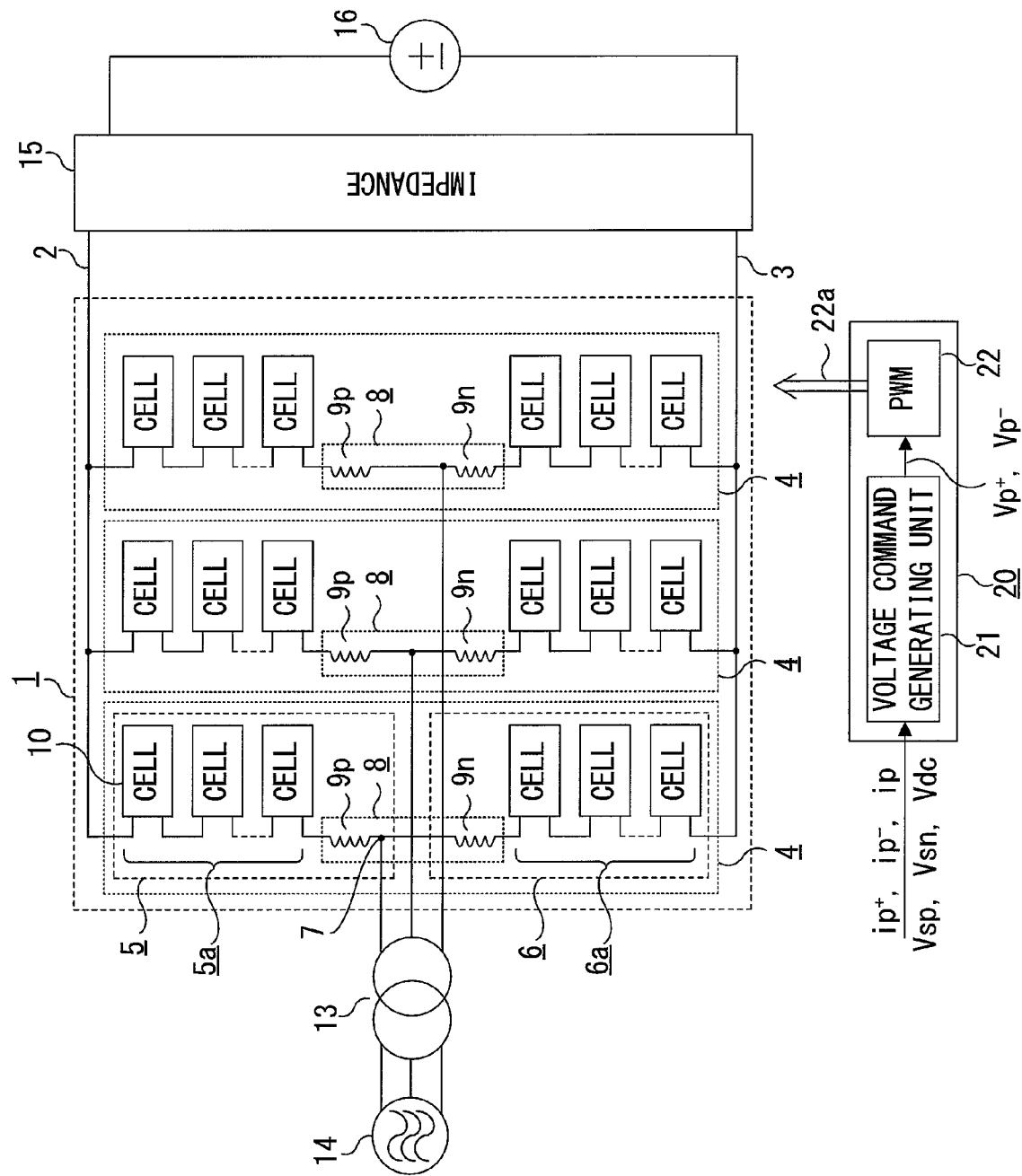
FIG. 1 is a schematic configuration diagram of a power conversion system according to embodiment 1 of the present invention.

Hereinafter, a power conversion system according to embodiment 1 of the present invention will be described below on the basis of the drawings. FIG. 1 is a schematic configuration diagram of the power conversion system according to embodiment 1 of the present invention.

As shown in FIG. 1, the power conversion system includes a power converter 1 as a main circuit, and a control device 20 for controlling the power converter 1. The power converter 1 performs power conversion between plural-phase AC, in this case, three-phase AC, and DC. The AC side of the power converter 1 is connected via an interconnection transformer 13 to an AC power supply 14 which is a grid as an AC circuit, and the DC side is connected via an impedance 15 to a DC power supply 16.

The connection to the AC power supply 14 may be made via an interconnection reactor instead of the interconnection transformer 13. The DC side of the power converter 1 may be connected to a DC load or may be connected to another power conversion system that performs DC output.

Each phase of the power converter 1 is composed of a leg 4 in which a positive arm 5 and a negative arm 6 are connected in series and an AC terminal 7 which is the connection point therebetween is connected to each phase AC line. The three legs 4 are connected in parallel between positive and negative DC buses 2 and 3.

The positive arm 5 and the negative arm 6 of each leg 4 are respectively composed of cell groups 5a and 6a each including one or more converter cells 10 connected in series, and a positive reactor 9p and a negative reactor 9n are provided in series in the respective arms. In this case, the positive reactor 9p and the negative reactor 9n are connected on the AC terminal 7 side, and the positive reactor 9p and the negative reactor 9n form a reactor 8 having three terminals.

The locations where the positive reactor 9p and the negative reactor 9n are provided may be any locations in the arms 5 and 6, and a plurality of each reactor may be provided.

The control device 20 includes: a voltage command generating unit 21 for generating a positive arm voltage command $Vp^+$ which is a first voltage command, and a negative arm voltage command $Vp^-$ which is a second voltage command; and a PWM circuit 22, to generate a gate signal 22a, thereby controlling each converter cell 10 in the positive arm 5 and the negative arm 6 for each phase.

Positive arm current $ip^+$ and negative arm current $ip^-$ respectively flowing through the positive arm 5 and the negative arm 6 for each phase, and AC current ip flowing through each phase AC line are detected by a current detector (not shown) and inputted to the control device 20. Further, each phase voltage (hereinafter, referred to as AC voltage Vsp) of the AC power supply 14 detected by a voltage detector (not shown), neutral point voltage Vsn of the power converter 1, and a command value (hereinafter, a DC voltage command value Vdc) for voltage of the DC power supply 16 which is voltage between the DC buses, are inputted to the control device 20. The AC current ip for each phase may be calculated from the positive arm current $ip^+$ and the negative arm current $ip^-$ respectively flowing through the positive arm 5 and the negative arm 6 for each phase, and may be used.

In the control device 20, the voltage command generating unit 21 generates the positive arm voltage command $Vp^+$ for the positive arm 5 for each phase, and the negative arm voltage command $Vp^-$ for the negative arm 6 for each phase, on the basis of the inputted information about voltage and current. Then, the PWM circuit 22 generates the gate signal 22a through pulse width modulation control (PWM control) on the basis of each voltage command $Vp^+$, $Vp^-$.

The details of the configuration and operation of the control device 20 will be described later.

Figure 2:
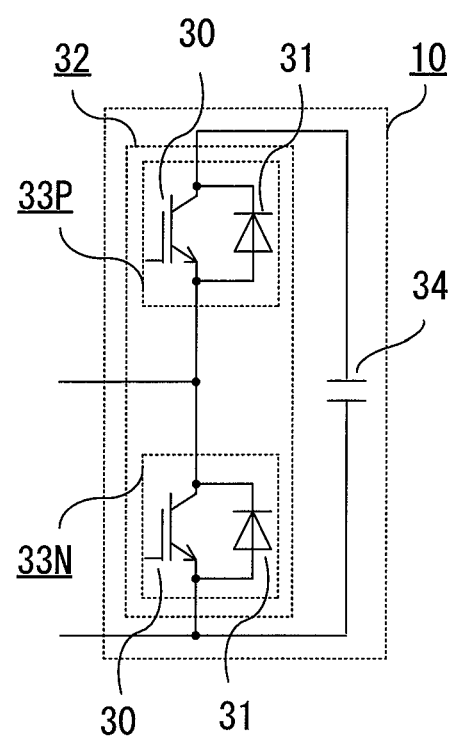
FIG. 2 is a circuit diagram showing the configuration of a converter cell according to embodiment 1 of the present invention.

FIG. 2 shows a configuration example of each converter cell 10. FIG. 2 shows the converter cell 10 in which a half-bridge configuration is employed.

The converter cell 10 in FIG. 2 is composed of: a series unit 32 of a plurality of (in this case, two) semiconductor switching elements 30 (hereinafter, simply referred to as switching elements) to which diodes 31 are respectively connected in antiparallel; and a DC capacitor 34 connected in parallel to the series unit 32 and for smoothing DC voltage. Each switching element 30 is formed of a self-turn-off switching element such as an IGBT (Insulated Gate Bipolar Transistor) or a GCT (Gate Commutated Turn-off thyristor), and the diodes 31 are respectively connected in antiparallel thereto, to form switches 33P and 33N.

As shown in FIG. 2, in the converter cell 10, both terminals of the switching element 30 of the switch 33N are used as output terminals, and through ON/OFF control of the switching element 30, both-terminal voltage of the DC capacitor 34 and zero voltage are outputted from the output terminals.

Figure 3:
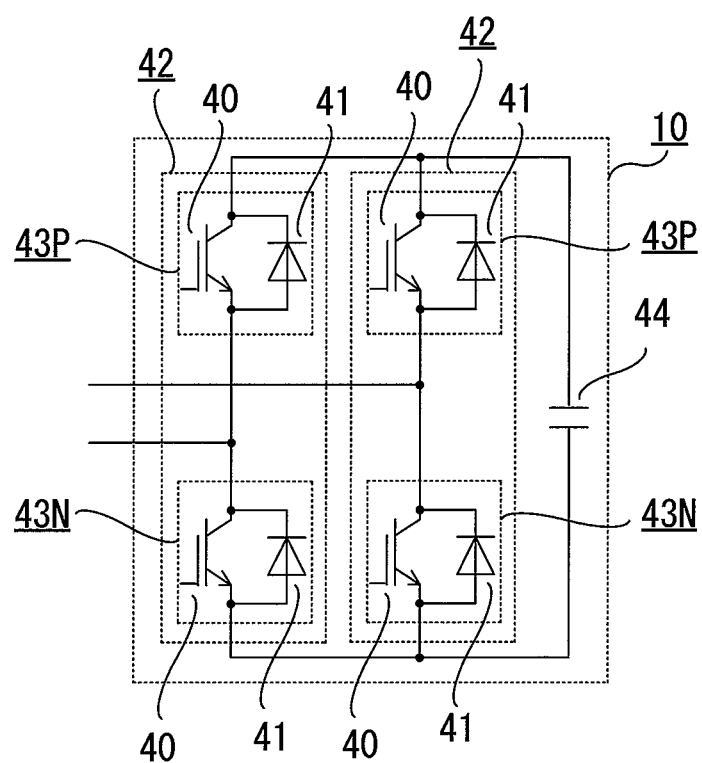
FIG. 3 is a circuit diagram showing another example of the configuration of the converter cell according to embodiment 1 of the present invention.

FIG. 3 shows another configuration example of each converter cell 10. FIG. 3 shows the converter cell 10 in which a full-bridge configuration is employed.

The converter cell 10 in FIG. 3 is composed of: two series units 42 connected in parallel; and a DC capacitor 44 connected in parallel to the series units 42 and for smoothing DC voltage. Each series unit 42 is composed of a plurality of (in this case, two) switching elements 40 connected in series, to which diodes 41 are respectively connected in antiparallel. Each switching element 40 is formed of a self-turn-off switching element such as an IGBT or a GCT, and the diodes 41 are respectively connected in antiparallel thereto, to form switches 43P and 43N.

As shown in FIG. 3, in the converter cell 10, terminals of the switching elements 40 corresponding to the intermediate connection points of the respective series units 42 are used as output terminals, and through ON/OFF control of the switching elements 40, positive voltage and negative voltage at both terminals of the DC capacitor 44 and zero voltage are outputted from the output terminals.

The converter cell 10 is not limited to the configurations shown in FIG. 2 and FIG. 3 as long as the converter cell 10 is composed of a series unit of a plurality of switching elements and a DC capacitor connected in parallel to the series unit, and selectively outputs voltage of the DC capacitor through switching operation.

Next, the details of the control device 20 will be described.

Since the power converter 1 outputs DC and AC, the power converter 1 needs to be controlled both on the DC side and the AC side. Further, since circulating current izp which circulates between the positive and negative arms without contributing to the AC-side output or the DC-side output flows in the power converter 1, it is necessary to control the circulating current izp in addition to the DC-side control and the AC-side control. In this case, since the AC terminals 7 are interconnected with the AC power supply 14 of the grid, it is necessary to output AC voltage needed for the AC-side control from the power converter 1, and control of performing compensation by feeding forward the AC voltage Vsp at the AC interconnection point is performed.

Figure 4:
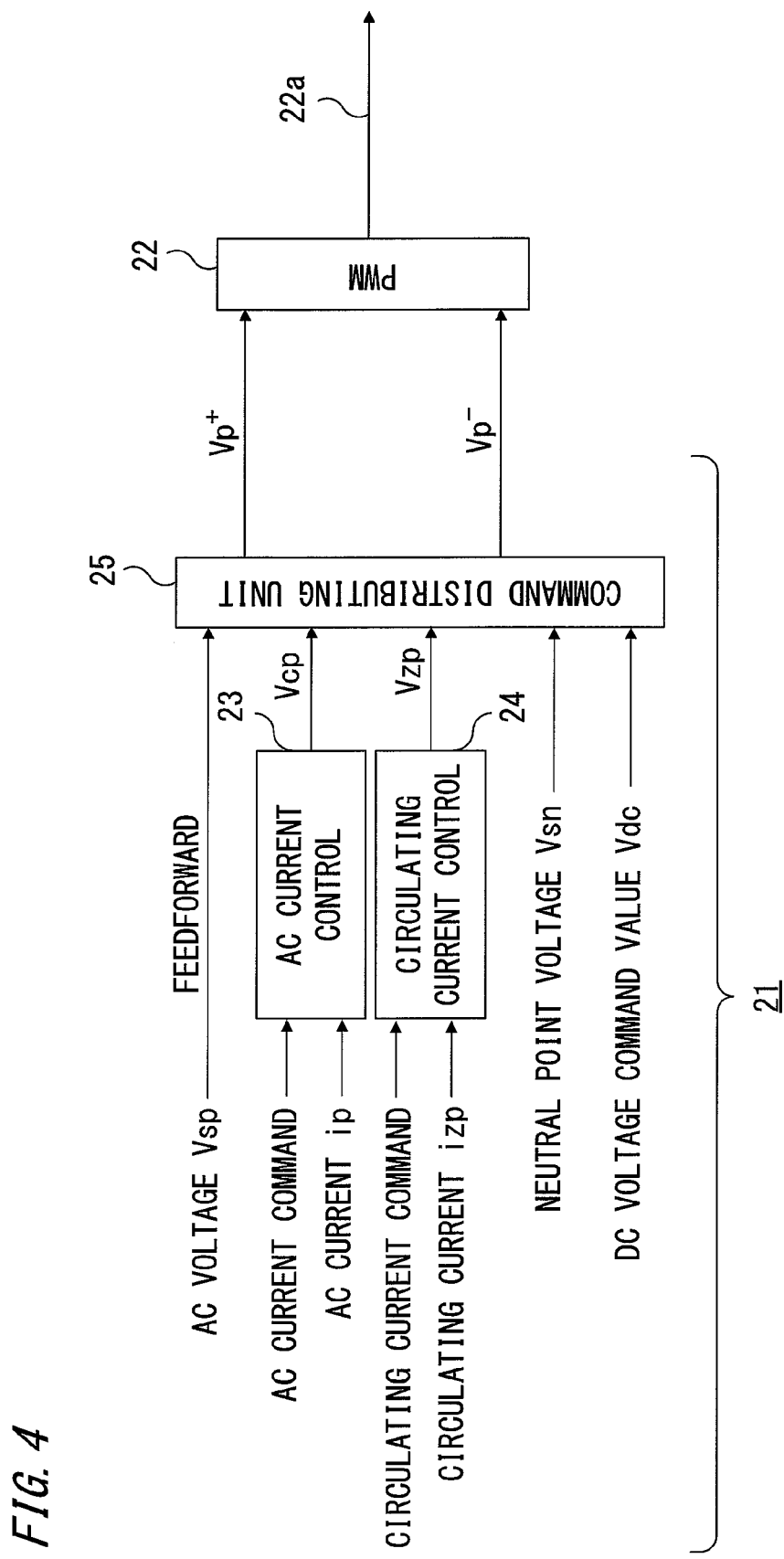
FIG. 4 is a block diagram showing a control configuration example of the power conversion system according to embodiment 1 of the present invention.

FIG. 4 is a block diagram showing a configuration example of the control device 20.

As described above, the control device 20 includes the voltage command generating unit 21 and the PWM circuit 22. The voltage command generating unit 21 includes, as a current control unit: an AC current control unit 23 for controlling the AC current ip; and a circulating current control unit 24 for controlling the circulating current izp for each phase which circulates in the power converter 1, and further includes a command distributing unit 25 for determining the positive arm voltage command $Vp^+$ and the negative arm voltage command $Vp^-$ for each phase.

The AC current control unit 23 calculates a first control command Vcp which is a voltage command so that the deviation between the detected AC current ip and a set AC current command becomes zero. That is, the AC current control unit 23 calculates the first control command Vcp for controlling the AC current ip flowing through each phase AC line to follow the AC current command.

The circulating current control unit 24 calculates a second control command Vzp which is a voltage command so that the deviation between the circulating current izp for each phase and a set circulating current command, e.g., zero, becomes zero. That is, the circulating current control unit 24 calculates the second control command Vzp for controlling the circulating current izp for each phase to follow the circulating current command. The circulating current izp for each phase can be calculated from the positive arm current $ip^+$ and the negative arm current $ip^-$ respectively flowing through the positive arm 5 and the negative arm 6 for each phase.

The command distributing unit 25 receives the calculated first control command Vcp and second control command Vzp, the DC voltage command value Vdc, and the neutral point voltage Vsn, and further receives the AC voltage Vsp for each phase as a feedforward component. In this case, since the AC side of the power converter 1 is connected via the interconnection transformer 13 to the AC power supply 14, the neutral point voltage Vsn is calculated from voltage of the DC power supply 16. The DC voltage command value Vdc may be given by DC output control, or may be a constant value.

In the case where the power converter 1 and the AC power supply 14 are not isolated from each other, the neutral point voltage Vsn is calculated from the AC voltage Vsp and voltage of the DC power supply 16.

On the basis of the above inputted information, the command distributing unit 25 subtracts voltage drop portions due to inductance values in the arms 5 and 6 from respective voltages assigned as outputs of the positive arm 5 and the negative arm 6, to distribute voltage components, thereby determining the positive arm voltage command $Vp^+$ for the positive arm 5 for each phase and the negative arm voltage command $Vp^-$ for the negative arm 6 for each phase.

The positive arm voltage command $Vp^+$ and the negative arm voltage command $Vp^-$ for each phase thus generated by the voltage command generating unit 21 are output voltage commands for controlling the AC current ip and the circulating current izp to respectively follow the AC current command and the circulating current command, controlling voltage of the DC power supply 16 to be the DC voltage command value Vdc, and performing feedforward control of the AC voltage Vsp.

The PWM circuit 22 generates the gate signal 22a to perform PWM control for each converter cell 10 in the positive arm 5 and the negative arm 6 for each phase, on the basis of the positive arm voltage command $Vp^+$ and the negative arm voltage command $Vp^-$.

By the generated gate signal 22a, the switching element 30 (40) in each converter cell 10 is drive-controlled, so that output voltage of the power converter 1 is controlled to be a desired value.

Next, calculation in the command distributing unit 25 will be described in detail below.

Figure 5:
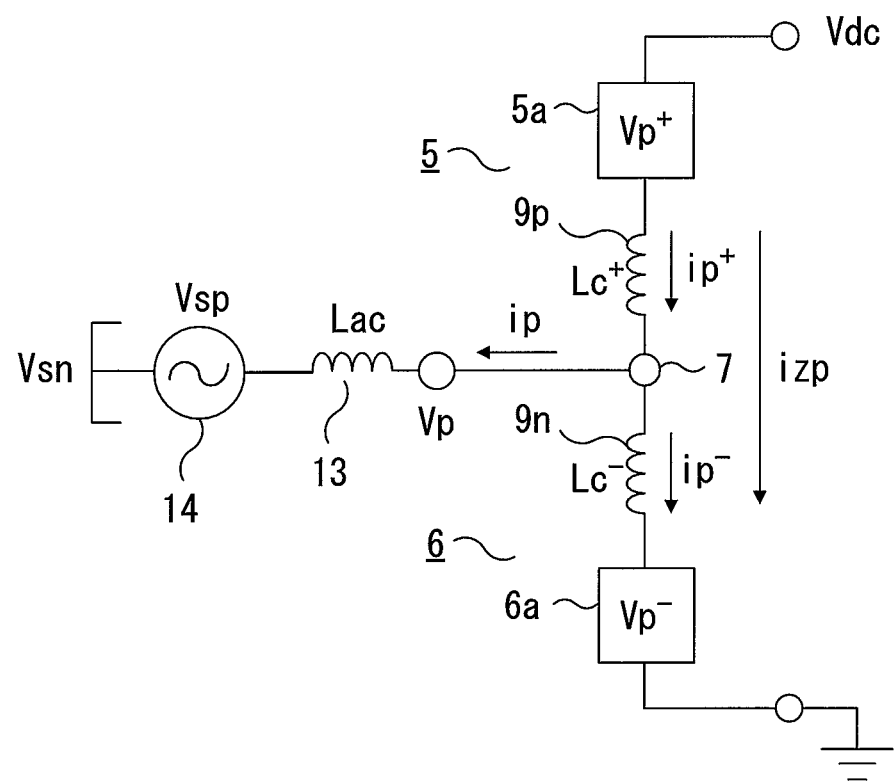
FIG. 5 is a diagram showing voltages and currents at various sections on a circuit in the power conversion system according to embodiment 1 of the present invention.

FIG. 5 is a diagram showing voltages and currents at various sections on a circuit, for one phase of the power converter 1.

Here, Lac denotes an inductance of the interconnection transformer 13, $Lc^+$ denotes an inductance of the positive reactor 9p, and $Lc^-$ denotes an inductance of the negative reactor 9n.

The positive arm voltage command $Vp^+$ is a command value for voltage to be outputted from the cell group 5a including the converter cells 10 connected in series in the positive arm 5, and the negative arm voltage command $Vp^-$ is a command value for voltage to be outputted from the cell group 6a including the converter cells 10 connected in series in the negative arm 6. In this case, the output voltages of the cell groups 5a and 6a are controlled to be $Vp^+$ and $Vp^-$.

In addition, voltage of the DC power supply 16 is controlled to be the DC voltage command value Vdc.

From Kirchhoff's current law, the relationship among the AC current ip, the positive arm current $ip^+$, and the negative arm current $ip^-$ is as follows.

$$ip = ip^+ - ip^-$$

The circulating current izp is defined as follows.

$$izp = (ip^+ + ip^-)/2$$

Accordingly, the positive arm current $ip^+$ and the negative arm current $ip^-$ are represented by the following Expression (1) and Expression (2).

[Mathematical 1]

Mathematical 1

$$ip^+ = \frac{ip}{2} + izp \qquad (1)$$

[Mathematical 2]

Mathematical 2

$$ip^- = -\frac{ip}{2} + izp \qquad (2)$$

In the circuit for one phase of the power converter 1 shown in FIG. 5, from Kirchhoff's voltage law on the DC side, the following expression is satisfied.

[Mathematical 3]

Mathematical 3

$$Vp^+ + Lc^+ \frac{dip^+}{dt} + Lc^- \frac{dip^-}{dt} + Vp^- = Vdc \tag{3}$$

From the Kirchhoff's voltage law on the AC side, the following expression is satisfied.

[Mathematical 4]

Mathematical 4

$$Lac \frac{dip}{dt} = Vp - (Vsp + Vsn) \tag{4}$$
$$= Lc^- \frac{dip^-}{dt} + Vp^- - (Vsp + Vsn)$$

By substituting Expression (1) and Expression (2) into Expression (3) and Expression (4) to eliminate $ip^+$ and $ip^-$ and rearranging the resultant expressions for the time derivatives of currents, the following expression is obtained.

[Mathematical 5]

Mathematical 5

$$\begin{pmatrix} Lac + \frac{Lc^-}{2} & -Lc^- \\ \frac{Lc^+ - Lc^-}{2} & Lc^+ - Lc^- \end{pmatrix} \begin{pmatrix} \frac{d}{dt}ip \\ \frac{d}{dt}izp \end{pmatrix} = \tag{5}$$

$$\begin{pmatrix} 0 & 1 \\ -1 & -1 \end{pmatrix} \begin{pmatrix} Vp^+ \\ Vp^- \end{pmatrix} + \begin{pmatrix} -(Vsp + Vsn) \\ Vdc \end{pmatrix}$$

By diagonalizing Expression (5) in order to prevent interference between the AC current ip and the circulating current izp, the following Expression (6) is obtained.

[Mathematical 6]

Mathematical 6

$$\begin{pmatrix} Lac + \frac{Lc^+ Lc^+}{Lc^+ + Lc^+} & 0 \\ 0 & Lc^+ + Lc^+ \end{pmatrix} \begin{pmatrix} \frac{d}{dt}ip \\ \frac{d}{dt}izp \end{pmatrix} = \tag{6}$$

$$\begin{pmatrix} -\frac{Lc^+}{Lc^+ + Lc^-} & \frac{Lc^+}{Lc^+ + Lc^-} \\ -\frac{2Lac + Lc^-}{2\left(Lac + \frac{Lc^+ Lc^-}{Lc^+ + Lc^-}\right)} & -\frac{2Lac + Lc^+}{2\left(Lac + \frac{Lc^+ Lc^-}{Lc^+ + Lc^-}\right)} \end{pmatrix} \begin{pmatrix} Vp^+ \\ Vp^- \end{pmatrix} +$$

$$\begin{pmatrix} -1 & \frac{Lc^-}{Lc^+ + Lc^-} \\ \frac{Lc^+ - Lc^-}{2\left(Lac + \frac{Lc^+ Lc^-}{Lc^+ + Lc^-}\right)} & \frac{2Lac + Lc^-}{2\left(Lac + \frac{Lc^+ Lc^-}{Lc^+ + Lc^-}\right)} \end{pmatrix} \begin{pmatrix} Vsp + Vsn \\ Vdc \end{pmatrix}$$

From Expression (6), it is found that the voltages $Vp^+$ and $Vp^-$ can be resolved into voltage components $Vp^+$ (i) and $Vp^-$(i) needed for controlling current, and voltage components $Vp^+$(v) and $Vp^-$(v) for controlling AC voltage and DC voltage.

From Expression (5), $Vp^+$(v) and $Vp^-$(v) for controlling voltage are represented as follows.

[Mathematical 7]

Mathematical 7

$$\begin{pmatrix} 0 & 1 \\ -1 & -1 \end{pmatrix} \begin{pmatrix} Vp^+(v) \\ Vp^-(v) \end{pmatrix} + \begin{pmatrix} -(Vsp + Vsn) \\ Vdc \end{pmatrix} = 0 \tag{7}$$

$$\begin{pmatrix} Vp^+(v) \\ Vp^-(v) \end{pmatrix} = \begin{pmatrix} -1 & 1 \\ 0 & 1 \end{pmatrix} \begin{pmatrix} Vsp + Vsn \\ Vdc \end{pmatrix}$$

From Expression (6), $Vp^+$(i) and $Vp^-$(i) for controlling current are represented as follows.

[Mathematical 8]

Mathematical 8

$$\begin{pmatrix} Lac + \frac{Lc^+ Lc^-}{Lc^+ + Lc^-} & 0 \\ 0 & Lc^+ + Lc^- \end{pmatrix} \begin{pmatrix} \frac{d}{dt}ip \\ \frac{d}{dt}izp \end{pmatrix} = \tag{8}$$

$$\begin{pmatrix} -\frac{Lc^-}{Lc^+ + Lc^-} & \frac{Lc^+}{Lc^+ + Lc^-} \\ -\frac{2Lac + Lc^-}{2\left(Lac + \frac{Lc^+ Lc^-}{Lc^+ + Lc^-}\right)} & -\frac{2Lac + Lc^+}{2\left(Lac + \frac{Lc^+ Lc^-}{Lc^+ + Lc^-}\right)} \end{pmatrix} \begin{pmatrix} Vp^+(i) \\ Vp^-(i) \end{pmatrix}$$

In order to prevent interference between the first control command Vcp for controlling the AC current ip to follow the AC current command and the second control command Vzp for controlling the circulating current izp to follow the circulating current command, and to perform the AC current control and the circulating current control independently of each other, from Expression (8), the first control command Vcp and the second control command Vzp only need to be represented by the following Expression (9).

[Mathematical 9]

Mathematical 9

$$\begin{pmatrix} 1 & 0 \\ 0 & 1 \end{pmatrix} \begin{pmatrix} Vcp \\ Vzp \end{pmatrix} = \tag{9}$$

$$\begin{pmatrix} -\frac{Lc^-}{Lc^+ + Lc^-} & \frac{Lc^+}{Lc^+ + Lc^-} \\ -\frac{2Lac + Lc^-}{2\left(Lac + \frac{Lc^+ Lc^-}{Lc^+ + Lc^-}\right)} & -\frac{2Lac + Lc^+}{2\left(Lac + \frac{Lc^+ Lc^-}{Lc^+ + Lc^-}\right)} \end{pmatrix} \begin{pmatrix} Vp^+(i) \\ Vp^-(i) \end{pmatrix}$$

Considering Expression (9), Expression (8) becomes the following Expression (10), and thus the AC current ip and the circulating current izp are respectively controlled by the first control command Vcp and the second control command Vzp independently of each other.

[Mathematical 10]

Mathematical 10

$$\begin{pmatrix} Lac + \dfrac{Lc^+ Lc^-}{Lc^+ + Lc^-} & 0 \\ 0 & Lc^+ + Lc^- \end{pmatrix} \begin{pmatrix} \dfrac{d}{dt} ip \\ \dfrac{d}{dt} izp \end{pmatrix} = \begin{pmatrix} 1 & 0 \\ 0 & 1 \end{pmatrix} \begin{pmatrix} Vcp \\ Vzp \end{pmatrix} \quad (10)$$

From the left-hand side of Expression (10), a control object of the AC current control is $Lac + Lc^+ \cdot Lc^-/(Lc^+ + Lc^-)$, and a control object of the circulating current control is $Lc^+ + Lc^-$.

In the AC current control, not only the inductance Lac on the AC power supply 14 side with respect to the AC terminal 7 but also a parallel inductance value $(Lc^+ \cdot Lc^-/(Lc^+ + Lc^-))$ of the positive arm 5 and the negative arm 6 is a control object. That is, in the first control command Vcp, a voltage drop portion due to the parallel inductance value is not taken into consideration.

Expression (9) is deformed into Expression (11), and from Expression (7) and Expression (11), the voltages $Vp^+$ and $Vp^-$ are represented by Expression (12).

[Mathematical 11]

Mathematical 11

$$\begin{pmatrix} Vp^+(i) \\ Vp^-(i) \end{pmatrix} = \begin{pmatrix} -\dfrac{2Lac + Lc^+}{2\left(Lac + \dfrac{Lc^+ Lc^-}{Lc^+ + Lc^-}\right)} & -\dfrac{Lc^+}{Lc^+ + Lc^-} \\ \dfrac{2Lac + Lc^-}{2\left(Lac + \dfrac{Lc^+ Lc^-}{Lc^+ + Lc^-}\right)} & -\dfrac{Lc^-}{Lc^+ + Lc^-} \end{pmatrix} \begin{pmatrix} Vcp \\ Vzp \end{pmatrix} \quad (11)$$

[Mathematical 12]

Mathematical 12

$$\begin{pmatrix} Vp^+ \\ Vp^- \end{pmatrix} = \begin{pmatrix} Vp^+(i) + Vp^+(v) \\ Vp^-(i) + Vp^-(v) \end{pmatrix}$$

$$= \begin{pmatrix} -\dfrac{2Lac + Lc^+}{2\left(Lac + \dfrac{Lc^+ Lc^-}{Lc^+ + Lc^-}\right)} & -\dfrac{Lc^+}{Lc^+ + Lc^-} \\ \dfrac{2Lac + Lc^-}{2\left(Lac + \dfrac{Lc^+ Lc^-}{Lc^+ + Lc^-}\right)} & -\dfrac{Lc^-}{Lc^+ + Lc^-} \end{pmatrix} \begin{pmatrix} Vcp \\ Vzp \end{pmatrix} +$$

$$\begin{pmatrix} -1 & 1 \\ 0 & 1 \end{pmatrix} \begin{pmatrix} Vsp + Vsn \\ Vdc \end{pmatrix} \quad (12)$$

In the command distributing unit 25, the voltages $Vp^+$ and $Vp^-$ represented by Expression (12) are used for the positive arm voltage command $Vp^+$ and the negative arm voltage command $Vp^-$.

The positive arm voltage command $Vp^+$ and the negative arm voltage command $Vp^-$ satisfy Expression (3), that is, are voltages obtained by subtracting voltage drop portions due to the inductance values in the arms 5 and 6 from respective voltages assigned as outputs of the positive arm 5 and the negative arm 6. Here, the inductance values involved with the voltage drop portions are inductance values from which the parallel inductance value of the arms 5 and 6 has been removed.

In $Vp^+$ and $Vp^-$ shown in Expression (12), voltage components regarding the first control command Vcp for controlling the AC current ip are voltages obtained by multiplying the first control command Vcp by coefficients. Since the AC current ip flows through the interconnection transformer 13, the positive reactor 9*p*, and the negative reactor 9*n*, the coefficients of the first control command Vcp are calculated from the inductances Lac, $Lc^+$, and $Lc^-$ of the interconnection transformer 13, the positive reactor 9*p*, and the negative reactor 9*n*. For the positive arm voltage command $Vp^+$, a negative coefficient is applied to the first control command Vcp, and for the negative arm voltage command $Vp^-$, a positive coefficient is applied to the first control command Vcp.

Since the AC current ip flows through the positive arm 5 and the negative arm 6 in directions opposite to each other, the voltage components regarding the first control command Vcp for the positive arm 5 and the negative arm 6 have polarities opposite to each other.

In $Vp^+$ and $Vp^-$ shown in Expression (12), a voltage component regarding the second control command Vzp for controlling the circulating current izp is voltage obtained by multiplying the second control command Vzp by a coefficient. Since the circulating current izp flowing between the positive arm 5 and the negative arm 6 flows through the positive reactor 9*p* and the negative reactor 9*n*, the coefficient of the second control command Vzp is calculated from the inductances $Lc^+$ and $Lc^-$ of the positive reactor 9*p* and the negative reactor 9*n*. For the positive arm voltage command $Vp^+$ and the negative arm voltage command $Vp^-$, coefficients having the same polarity are applied to the second control command Vzp.

Since the circulating current izp flows through the positive arm 5 and the negative arm 6 in the same direction, the voltage components regarding the second control command Vzp for the positive arm 5 and the negative arm 6 have the same polarity.

The voltage components regarding the AC voltage Vsp and the neutral point voltage Vsn have a negative polarity for the positive arm 5, and a positive polarity for the negative arm 6, as in the voltage components regarding the first control command Vcp. In this case, the coefficients for the positive arm 5 and the negative arm 6 have the same magnitude of 1.

The voltage component regarding the DC voltage command value Vdc is only voltage for the positive arm 5, and the coefficient thereof is one.

As described above, in the present embodiment, voltage drop portions due to the inductance values in the arms 5 and 6 are subtracted from respective voltages assigned as outputs of the positive arm 5 and the negative arm 6 of the power converter 1, to distribute voltage components, thereby determining the positive arm voltage command $Vp^+$ for the positive arm 5 for each phase and the negative arm voltage command $Vp^-$ for the negative arm 6 for each phase. Thus, even if the inductance values in the arms 5 and 6 are different from each other, interference does not occur between the current control for the AC current ip and the current control for the circulating current izp, and the power converter 1 is controlled stably and reliably.

Embodiment 2

Figure 6:
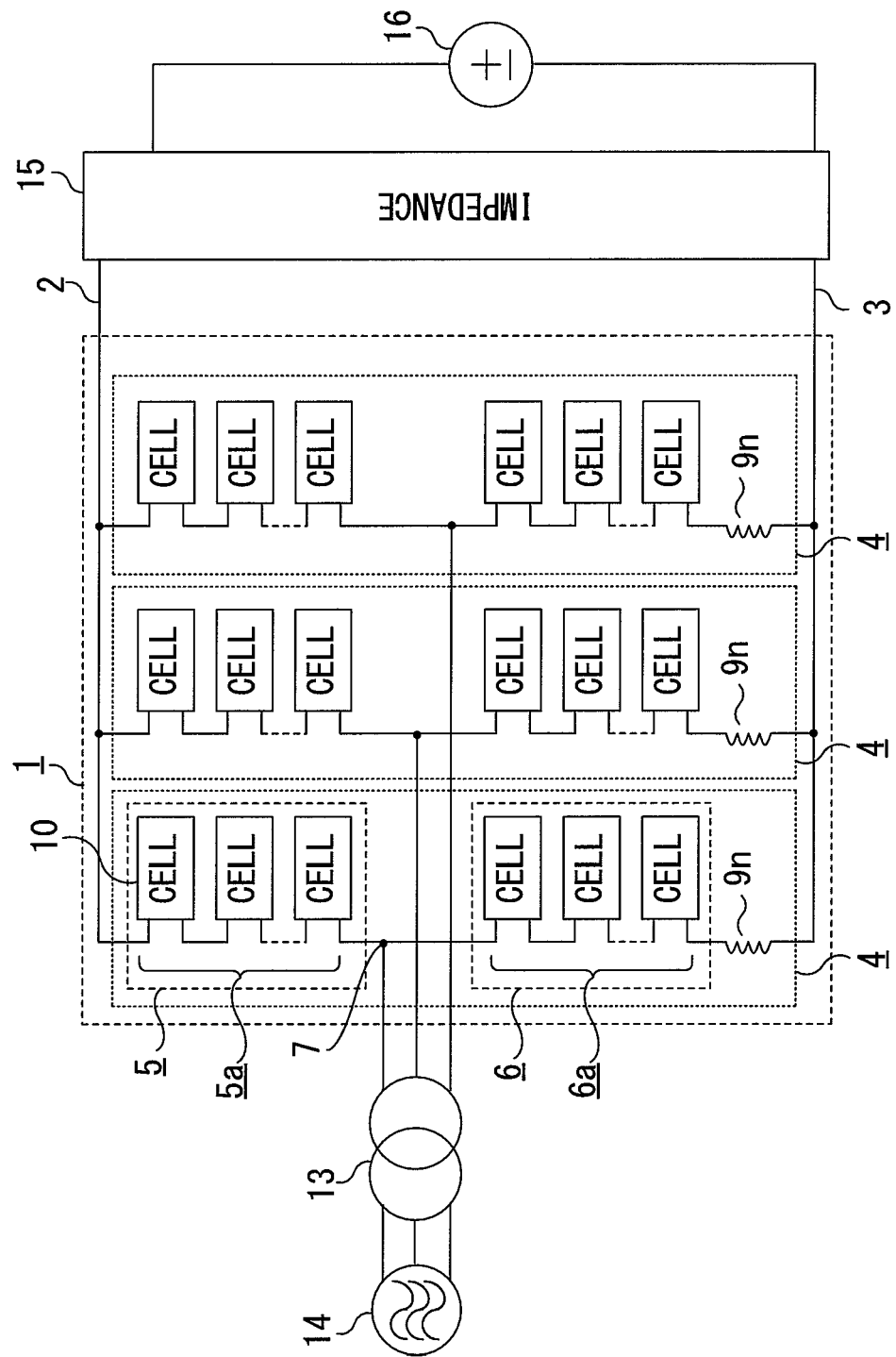
FIG. 6 is a schematic configuration diagram of a power conversion system according to embodiment 2 of the present invention.

Next, a power conversion system according to embodiment 2 of the present invention will be described below on the basis of FIG. 6. FIG. 6 is a schematic configuration diagram of the power conversion system according to embodiment 2 of the present invention.

In the present embodiment 2, the positive arm 5 and the negative arm 6 of each leg 4 are respectively composed of the cell groups 5a and 6a each including one or more converter cells 10 connected in series, and only for the negative arm 6, the negative reactor 9n is provided in series on the negative side of the cell group 6a. The other configuration is the same as that in the above embodiment 1 shown in FIG. 1.

For convenience sake, the control device 20 is not shown in FIG. 6.

The configuration of the control device 20 is the same as that in the above embodiment 1 shown in FIG. 4. However, in this case, since the positive reactor 9p is not provided, calculation in the command distributing unit 25 is different as shown below.

By setting the inductance $Lc^+$ at zero and deforming Expression (12) in the above embodiment 1, the following Expression (13) is obtained.

[Mathematical 13]

Mathematical 13

$$\begin{pmatrix} Vp^+ \\ Vp^- \end{pmatrix} = \begin{pmatrix} -1 & 0 \\ 1 + \frac{Lc^-}{Lac} & -1 \end{pmatrix} \begin{pmatrix} Vcp \\ Vzp \end{pmatrix} + \begin{pmatrix} -1 & 1 \\ 1 & 0 \end{pmatrix} \begin{pmatrix} Vsp + Vsn \\ Vdc \end{pmatrix} \quad (13)$$

In the command distributing unit 25, voltages $Vp^+$ and $Vp^-$ shown in Expression (13) are used for the positive arm voltage command $Vp^+$ and the negative arm voltage command $Vp^-$.

In $Vp^+$ and $Vp^-$ shown in Expression (13), voltage components regarding the first control command Vcp for controlling the AC current ip are voltages obtained by multiplying the first control command Vcp by coefficients. The AC current ip flows through the positive arm 5 and the negative arm 6 in directions opposite to each other. For the positive arm voltage command $Vp^+$, a negative coefficient is applied to the first control command Vcp, and for the negative arm voltage command $Vp^-$, a positive coefficient is applied to the first control command Vcp. In this case, since the positive reactor does not exist, the magnitude of the coefficient for the positive arm 5 is one. The coefficient for the negative arm 6 is calculated from the inductances Lac and $Lc^-$ of the interconnection transformer 13 and the negative reactor 9n.

In $Vp^+$ and $Vp^-$ shown in Expression (13), a voltage component regarding the second control command Vzp for controlling the circulating current izp is voltage obtained by multiplying the second control command Vzp by a coefficient. In this case, since the positive reactor does not exists, the voltage component regarding the second control command Vzp is only a voltage component for the negative arm 6, and the coefficient thereof is −Vzp.

The voltage components regarding the AC voltage Vsp, the neutral point voltage Vsn, and the DC voltage command value Vdc are the same as those in the above embodiment 1. Among voltages assigned to these, there is no difference due to an inductance value.

Also in the present embodiment, as in the above embodiment 1, the command distributing unit 25 subtracts voltage drop portions due to the inductance values in the arms 5 and 6 from respective voltages assigned as outputs of the positive arm 5 and the negative arm 6 of the power converter 1, to distribute voltage components, thereby determining the positive arm voltage command $Vp^+$ for the positive arm 5 for each phase and the negative arm voltage command $Vp^-$ for the negative arm 6 for each phase.

In the leg 4 for each phase of the power converter 1, a reactor (negative reactor 9n) is provided only on the negative side of the cell group 6a of the negative arm 6. Therefore, the negative reactor 9n may be a small-size element with a low withstand voltage property, and thus the power converter 1 has a configuration suitable for downsizing.

Thus, the positive arm voltage command $Vp^+$ and the negative arm voltage command $Vp^-$ for the power converter 1 suitable for downsizing are reliably generated, interference does not occur between the current control for the AC current ip and the current control for the circulating current izp, and the power converter 1 is controlled stably and reliably.

The negative reactor 9n may be provided on the positive side of the cell group 6a of the negative arm 6, and as in the above embodiment 2, the control device 20 generates the positive arm voltage command $Vp^+$ and the negative arm voltage command $Vp^-$ to control the power converter 1.

Embodiment 3

Figure 7:
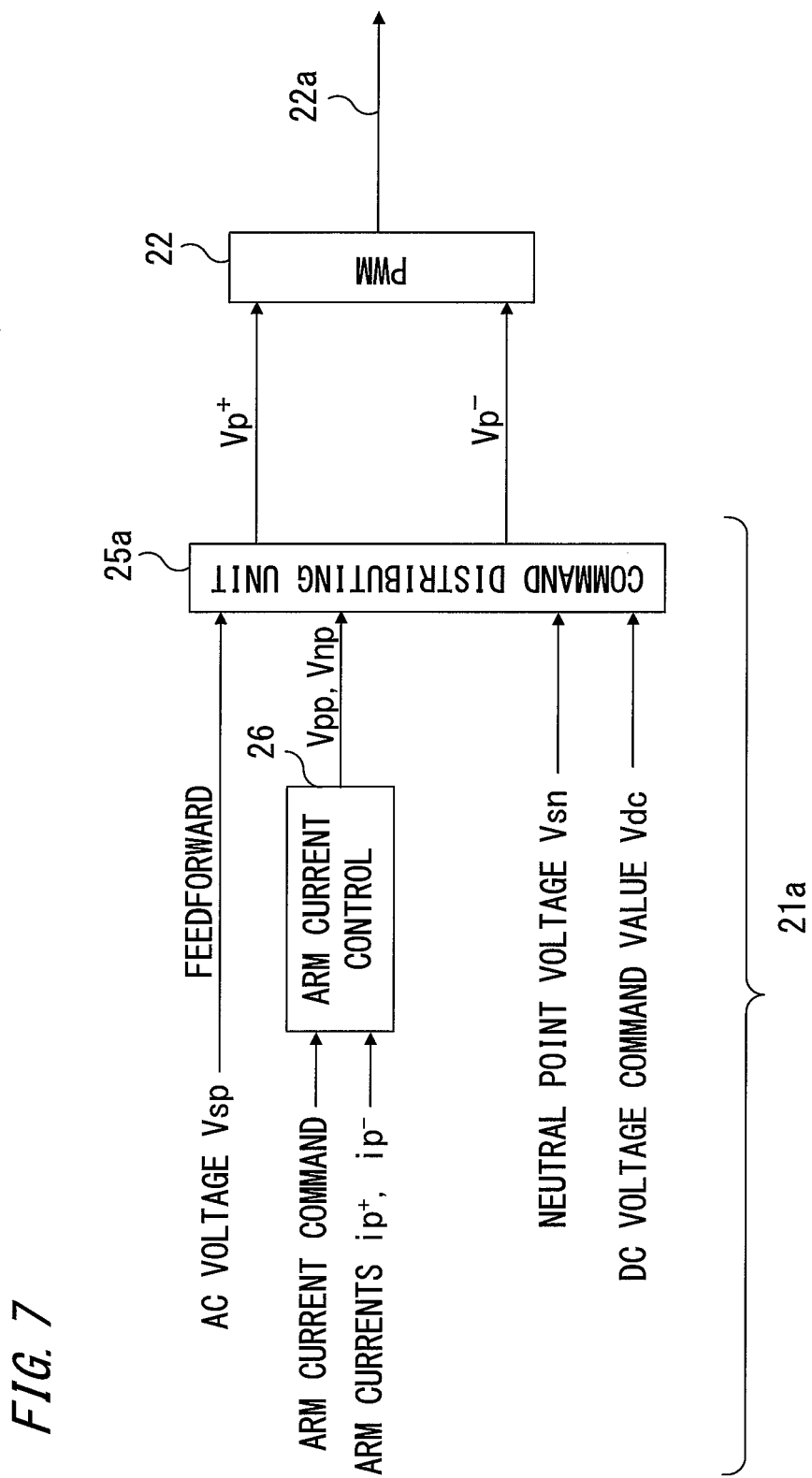
FIG. 7 is a block diagram showing a control configuration example of a power conversion system according to embodiment 3 of the present invention.

Next, a power conversion system according to embodiment 2 of the present invention will be described on the basis of FIG. 7. In the present embodiment 3, the same power converter 1 as that in the above embodiment 1 shown in FIG. 1 is used, and the configuration of the voltage command generating unit in the control device 20 is different from that in the above embodiment 1. FIG. 7 is a block diagram showing a configuration example of the control device 20 according to the present embodiment 3.

The control device 20 includes: a voltage command generating unit 21a for generating a positive arm voltage command $Vp^+$ and a negative arm voltage command $Vp^-$; and the PWM circuit 22, to generate a gate signal 22a, thereby controlling each converter cell 10 in the positive arm 5 and the negative arm 6 for each phase.

Positive arm current $ip^+$ and negative arm current $ip^-$ respectively flowing through the positive arm 5 and the negative arm 6 for each phase, AC voltage Vsp which is each phase voltage of the AC power supply 14, neutral point voltage Vsn of the power converter 1, and a DC voltage command value Vdc are inputted to the voltage command generating unit 21a of the control device 20.

The voltage command generating unit 21a includes, as a current control unit, an arm current control unit 26 for controlling the positive arm current $ip^+$ and the negative arm current $ip^-$, and further includes a command distributing unit 25a for determining the positive arm voltage command $Vp^+$ and the negative arm voltage command $Vp^-$ for each phase.

The arm current control unit 26 calculates a third control command Vpp and a fourth control command Vnp which are voltage commands so that the deviation between each of the detected positive arm current $ip^+$ and negative arm current $ip^-$, and each set arm current command, becomes zero. That is, the arm current control unit 26 calculates the third control command Vpp and the fourth control command Vnp for controlling the positive arm current $ip^+$ and the negative arm current $ip^-$ to follow the respective arm current commands.

A positive arm current command $ipr^+$ and a negative arm current command $ipr^-$ are calculated by the following expressions, for example. Here, ipr is an AC current command, idcr is a DC current command, and izpr is a circulating current command.

$ipr^+ = (1/2)ipr + (1/3)idcr + izpr$ $ipr^- = -(1/2)ipr + (1/3)idcr + izpr$

The command distributing unit 25a receives the calculated third control command Vpp and fourth control command Vnp, the DC voltage command value Vdc, and the neutral point voltage Vsn, and further receives the AC voltage Vsp for each phase as a feedforward component. On the basis of the above inputted information, the command distributing unit 25a subtracts voltage drop portions due to inductance values in the arms 5 and 6 from respective voltages assigned as outputs of the positive arm 5 and the negative arm 6, to distribute voltage components, thereby determining the positive arm voltage command Vp$^+$ for the positive arm 5 for each phase and the negative arm voltage command Vp$^-$ for the negative arm 6 for each phase.

The positive arm voltage command Vp$^+$ and the negative arm voltage command Vp$^-$ for each phase thus generated by the voltage command generating unit 21a are output voltage commands for controlling the positive arm current ip$^+$ and the negative arm current ip$^-$ to follow the respective arm current commands, thereby controlling the AC current ip and the circulating current izp, and for performing feedforward control for the AC voltage Vsp.

The PWM circuit 22 generates the gate signal 22a to perform PWM control for each converter cell 10 in the positive arm 5 and the negative arm 6 for each phase, on the basis of the positive arm voltage command Vp$^+$ and the negative arm voltage command Vp$^-$.

Next, calculation in the command distributing unit 25a will be described in detail below.

The relationship among voltages and currents at various sections for one phase of the power converter 1 is the same as that shown in FIG. 5 in the above embodiment 1, and the above Expressions (1) to (4) are satisfied.

From ip=ip$^+$−ip$^-$ which is a relational expression among the AC current ip, the positive arm current ip$^+$, and the negative arm current ip$^-$, Expression (3), and Expression (4), by eliminating ip and rearranging the resultant expressions for the time derivatives of current, the following expression is obtained.

[Mathematical 14]

Mathematical 14

$$\begin{pmatrix} Lac + Lc^+ & -Lac \\ -Lac & Lac + Lc^- \end{pmatrix} \begin{pmatrix} \frac{d}{dt}ip^+ \\ \frac{d}{dt}ip^- \end{pmatrix} = \\ -\begin{pmatrix} Vp^+ \\ Vp^- \end{pmatrix} + \begin{pmatrix} -1 & 1 \\ 0 & 1 \end{pmatrix} \begin{pmatrix} Vsp + Vsn \\ Vdc \end{pmatrix} \quad (14)$$

By diagonalizing Expression (14) in order to prevent interference between the positive arm current ip$^+$ and the negative arm current ip$^-$, the following Expression (15) is obtained.

[Mathematical 15]

Mathematical 15

$$\begin{pmatrix} \frac{d}{dt}ip^+ \\ \frac{d}{dt}ip^- \end{pmatrix} = \\ \begin{pmatrix} Lac + Lc^+ & -Lac \\ -Lac & Lac + Lc^- \end{pmatrix}^{-1} \left( -\begin{pmatrix} Vp^+ \\ Vp^- \end{pmatrix} + \begin{pmatrix} -1 & 1 \\ 0 & 1 \end{pmatrix} \begin{pmatrix} Vsp + Vsn \\ Vdc \end{pmatrix} \right) \quad (15)$$

From Expression (15), it is found that the voltages Vp$^+$ and Vp$^-$ can be resolved into voltage components Vp$^+$(i) and Vp$^-$(i) needed for controlling current, and voltage components Vp$^+$(v) and Vp$^-$(v) for controlling AC voltage and DC voltage.

From Expression (15), Vp$^+$(v) and Vp$^-$(v) for controlling voltage are represented as follows.

[Mathematical 16]

Mathematical 16

$$-\begin{pmatrix} Vp^+ \\ Vp^- \end{pmatrix} + \begin{pmatrix} -1 & 1 \\ 0 & 1 \end{pmatrix} \begin{pmatrix} Vsp + Vsn \\ Vdc \end{pmatrix} = 0 \quad (16)$$

$$\begin{pmatrix} Vp^+(v) \\ Vp^-(v) \end{pmatrix} = \begin{pmatrix} -1 & 1 \\ 0 & 1 \end{pmatrix} \begin{pmatrix} Vsp + Vsn \\ Vdc \end{pmatrix}$$

From Expression (15), Vp$^+$(i) and Vp$^-$(i) for controlling current are represented as follows.

[Mathematical 17]

Mathematical 17

$$\begin{pmatrix} \frac{d}{dt}ip^+ \\ \frac{d}{dt}ip^- \end{pmatrix} = -\begin{pmatrix} Lac + Lc^+ & -Lac \\ -Lac & Lac + Lc^- \end{pmatrix}^{-1} \begin{pmatrix} Vp^+(i) \\ Vp^-(i) \end{pmatrix} \quad (17)$$

On the basis of Expression (17), the third control command Vpp for controlling the positive arm current ip$^+$ to follow the positive arm current command, and the fourth control command Vnp for controlling the negative arm current ip$^-$ to follow the negative arm current command, are represented by the following Expression (18).

[Mathematical 18]

Mathematical 18

$$\begin{pmatrix} Vpp \\ Vnp \end{pmatrix} = -\begin{pmatrix} Lac + Lc^+ & -Lac \\ -Lac & Lac + Lc^- \end{pmatrix}^{-1} \begin{pmatrix} Vp^+(i) \\ Vp^-(i) \end{pmatrix} \quad (18)$$

Expression (18) is deformed into Expression (19), and from Expression (16) and Expression (19), the voltages Vp$^+$ and Vp$^-$ are represented by Expression (20).

[Mathematical 19]

Mathematical 19

$$\begin{pmatrix} Vp^+(i) \\ Vp^-(i) \end{pmatrix} = \begin{pmatrix} 1 - \dfrac{Lac^2}{(Lac+Lc^+)(Lac+Lc^-)} & \dfrac{Lac+Lc^-}{Lac} - \dfrac{Lac}{Lac+Lc^+} \\ \dfrac{Lac+Lc^+}{Lac} - \dfrac{Lac}{Lac+Lc^-} & 1 - \dfrac{Lac^2}{(Lac+Lc^+)(Lac+Lc^-)} \end{pmatrix} \begin{pmatrix} Vpp \\ Vnp \end{pmatrix} \quad (19)$$

[Mathematical 20]

Mathematical 20

$$\begin{pmatrix} Vp^+ \\ Vp^- \end{pmatrix} = \begin{pmatrix} Vp^+(i)+Vp^+(v) \\ Vp^-(i)+Vp^-(v) \end{pmatrix} = \begin{pmatrix} 1 - \dfrac{Lac^2}{(Lac+Lc^+)(Lac+Lc^-)} & \dfrac{Lac+Lc^-}{Lac} - \dfrac{Lac}{Lac+Lc^+} \\ \dfrac{Lac+Lc^+}{Lac} - \dfrac{Lac}{Lac+Lc^-} & 1 - \dfrac{Lac^2}{(Lac+Lc^+)(Lac+Lc^-)} \end{pmatrix} \begin{pmatrix} Vpp \\ Vnp \end{pmatrix} + \begin{pmatrix} -1 & 1 \\ 0 & 1 \end{pmatrix} \begin{pmatrix} Vsp+Vsn \\ Vdc \end{pmatrix} \quad (20)$$

In the command distributing unit 25*a*, the voltages Vp⁺ and Vp⁻ represented by Expression (20) are used for the positive arm voltage command Vp⁺ and the negative arm voltage command Vp⁻.

The positive arm voltage command Vp⁺ and the negative arm voltage command Vp⁻ satisfy Expression (3), that is, are voltages obtained by subtracting voltage drop portions due to the inductance values in the arms 5 and 6 from respective voltages assigned as outputs of the positive arm 5 and the negative arm 6.

In Vp⁺ and Vp⁻ shown in Expression (20), coefficients of the third control command Vpp and the fourth control command Vnp for respectively controlling the positive arm current ip⁺ and the negative arm current ip⁻ are calculated from the inductances Lac, Lc⁺, and Lc⁻ of the interconnection transformer 13, the positive reactor 9*p*, and the negative reactor 9*n*.

The voltage components regarding the AC voltage Vsp, the neutral point voltage Vsn, and the DC voltage command value Vdc are the same as those in the above embodiment 1. Among voltages assigned to these, there is no difference due to an inductance value.

As described above, in the present embodiment, voltage drop portions due to the inductance values in the arms 5 and 6 are subtracted from respective voltages assigned as outputs of the positive arm 5 and the negative arm 6 of the power converter 1, to distribute voltage components, thereby determining the positive arm voltage command Vp⁺ for the positive arm 5 for each phase and the negative arm voltage command Vp⁻ for the negative arm 6 for each phase. Thus, even if the inductance values in the arms 5 and 6 are different from each other, interference does not occur between the current control for the positive arm current ip⁺ and the current control for the negative arm current ip⁻, and the power converter 1 is controlled stably and reliably. In addition, by respectively controlling the positive arm current ip⁺ and the negative arm current ip⁻, the AC current ip is controlled to be the AC current command, and the circulating current ip is controlled to be the circulating current command.

Embodiment 4

Next, a power conversion system according to embodiment 4 of the present invention will be described below. In the present embodiment, the power converter 1 having the same configuration as that in the above embodiment 2 shown in FIG. 6 is used, and the control in the above embodiment 3 shown in FIG. 7 is applied.

That is, in the present embodiment 4, as shown in FIG. 6, the positive arm 5 and the negative arm 6 of each leg 4 are respectively composed of the cell groups 5*a* and 6*a* each including one or more converter cells 10 connected in series, and only for the negative arm 6, the negative reactor 9*n* is provided in series on the negative side of the cell group 6*a*. Although the same control device 20 as in the above embodiment 3 is used, in this case, since the positive reactor 9*p* does not exist, calculation in the command distributing unit 25*a* is different as shown below.

By setting the inductance Lc⁺ at zero and deforming Expression (20) in the above embodiment 3, the following Expression (21) is obtained.

[Mathematical 21]

Mathematical 21

$$\begin{pmatrix} Vp^+ \\ Vp^- \end{pmatrix} = \begin{pmatrix} 1 - \dfrac{Lac}{Lac+Lc^-} & \dfrac{Lac+Lc^-}{Lac} - 1 \\ 1 - \dfrac{Lac}{Lac+Lc^-} & 1 - \dfrac{Lac}{Lac+Lc^-} \end{pmatrix} \begin{pmatrix} Vpp \\ Vnp \end{pmatrix} + \begin{pmatrix} -1 & 1 \\ 1 & 0 \end{pmatrix} \begin{pmatrix} Vsp+Vsn \\ Vdc \end{pmatrix} \quad (21)$$

In the command distributing unit 25*a*, voltages Vp⁺ and Vp⁻ shown in Expression (21) are used for the positive arm voltage command Vp⁺ and the negative arm voltage command Vp⁻.

In Vp⁺ and Vp⁻ shown in Expression (21), coefficients of the third control command Vpp and the fourth control command Vnp for respectively controlling the positive arm current ip⁺ and the negative arm current ip⁻ are calculated from the inductances Lac and Lc⁻ of the interconnection transformer 13 and the negative reactor 9*n*.

The voltage components regarding the AC voltage Vsp, the neutral point voltage Vsn, and the DC voltage command value Vdc are the same as those in the above embodiment 1. Among voltages assigned to these, there is no difference due to an inductance value.

As described above, also in the present embodiment, voltage drop portions due to the inductance values in the arms 5 and 6 are subtracted from respective voltages assigned as outputs of the positive arm 5 and the negative arm 6 of the power converter 1, to distribute voltage components, thereby determining the positive arm voltage command Vp⁺ for the positive arm 5 for each phase and the negative arm voltage command Vp⁻ for the negative arm 6 for each phase.

In the leg 4 for each phase of the power converter 1, a reactor (negative reactor 9n) is provided only on the negative side of the cell group 6a of the negative arm 6. Therefore, the negative reactor 9n may be a small-size element with a low withstand voltage property, and thus the power converter 1 has a configuration suitable for downsizing.

Thus, the positive arm voltage command $Vp^+$ and the negative arm voltage command $Vp^-$ for the power converter 1 suitable for downsizing are reliably generated, interference does not occur between the current control for the positive arm current $ip^+$ and the current control for the negative arm current $ip^-$, and the power converter 1 is controlled stably and reliably. In addition, by respectively controlling the positive arm current $ip^+$ and the negative arm current $ip^-$, the AC current ip is controlled to be the AC current command, and the circulating current ip is controlled to be the circulating current command.

Embodiment 5

Next, a power conversion system according to embodiment 4 of the present invention will be described. In the present embodiment, the case where the inductance $Lc^+$ of the positive reactor 9p and the inductance $Lc^-$ of the negative reactor 9n are equal to each other in the above embodiment 3 will be described.

That is, in the present embodiment 5, as shown in FIG. 1, the positive arm 5 and the negative arm 6 of each leg 4 are respectively composed of cell groups 5a and 6a each including one or more converter cells 10 connected in series, and the positive reactor 9p and the negative reactor 9n are respectively provided in series in the positive arm 5 and the negative arm 6. In the same control device 20 as in the above embodiment 3, calculation in the command distributing unit 25a is as follows.

By deforming Expression (20) in the above embodiment 3 under $Lc^+=Lc^-=Lc$, the following Expression (22) is obtained.

[Mathematical 22]

Mathematical 22

$$\begin{pmatrix} Vp^+ \\ Vp^- \end{pmatrix} = \begin{pmatrix} 1-\left(\frac{Lac}{Lac+Lc}\right)^2 & \frac{Lac+Lc}{Lac} - \frac{Lac}{Lac+Lc} \\ \frac{Lac+Lc}{Lac} - \frac{Lac}{Lac+Lc} & 1-\left(\frac{Lac}{Lac+Lc}\right)^2 \end{pmatrix} \begin{pmatrix} Vpp \\ Vnp \end{pmatrix} + \begin{pmatrix} -1 & 1 \\ 1 & 0 \end{pmatrix} \begin{pmatrix} Vsp+Vsn \\ Vdc \end{pmatrix} \quad (22)$$

In the command distributing unit 25a, voltages $Vp^+$ and $Vp^-$ shown in Expression (22) are used for the positive arm voltage command $Vp^+$ and the negative arm voltage command $Vp^-$.

In $Vp^+$ and $Vp^-$ shown in Expression (22), coefficients of the third control command Vpp and the fourth control command Vnp for respectively controlling the positive arm current $ip^+$ and the negative arm current $ip^-$ are calculated from the inductances Lac and Lc of the interconnection transformer 13, the positive reactor 9p, and the negative reactor 9n.

The voltage components regarding the AC voltage Vsp, the neutral point voltage Vsn, and the DC voltage command value Vdc are the same as those in the above embodiment 1. Among voltages assigned to these, there is no difference due to an inductance value.

Thus, also in the case where the inductances of the positive reactor 9p and the negative reactor 9n are equal to each other, the same control as in the case where the inductances are different can be applied, and stable control can be achieved in the same manner.

In the present embodiment, the case of applying embodiment 3 in which the positive arm current $ip^+$ and the negative arm current $ip^-$ are controlled individually, has been described. However, the above embodiment 1 may be applied. That is, in the case of controlling the AC current ip and the circulating current izp individually, Expression (12) in the above embodiment 1 is deformed under $Lc^+=Lc^-=Lc$, and is applied.

Embodiment 6

Next, a power conversion system according to embodiment 6 of the present invention will be described.

Figure 8:
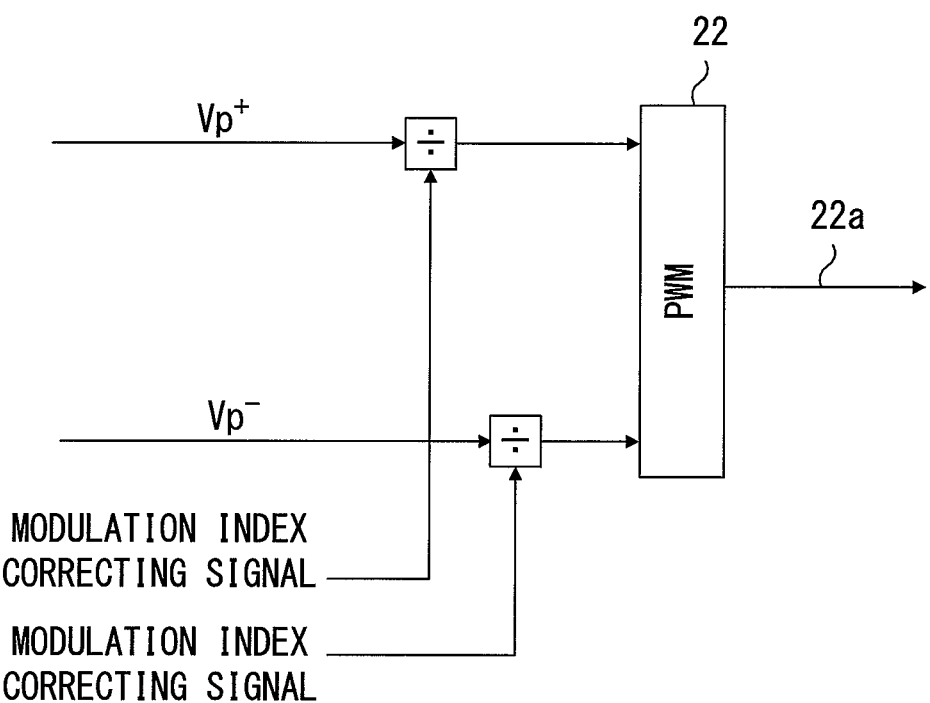
FIG. 8 is a block diagram for explaining control in a power conversion system according to embodiment 6 of the present invention.

In the present embodiment, as shown in FIG. 8, the positive arm voltage command $Vp^+$ and the negative arm voltage command $Vp^-$ generated in the control device 20 are corrected by modulation index correcting signals and then inputted to the PWM circuit 22.

The DC capacitor 34 (44) of each converter cell 10 in the positive arm 5 and the negative arm 6 varies in accordance with the phase of the AC power supply 14. Therefore, the control device 20 generates a modulation index correcting signal based on voltage of each DC capacitor 34 (44), and uses the positive arm voltage command $Vp^+$ and the negative arm voltage command $Vp^-$ divided by the modulation index correcting signals. Thus, the modulation indexes for the positive arm 5 and the negative arm 6 determined by the positive arm voltage command $Vp^+$ and the negative arm voltage command $Vp^-$ are corrected in accordance with the phase of the AC power supply 14, whereby controllability is improved.

For the modulation index correcting signal, for example, the average voltage of the DC capacitors 34 (44) of all the converter cells 10 in the positive arm 5 and the negative arm 6 may be used, or the average voltage of the DC capacitors 34 (44) of the converter cells 10 in each arm may be used.

The positive arm voltage command $Vp^+$ and the negative arm voltage command $Vp^-$ may be derived for each converter cell 10, and voltage of the DC capacitor 34 (44) for each converter cell 10 may be used for the modulation index correcting signal.

In the above embodiments, the AC side of the power converter 1 is interconnected with the grid, and the control device 20 performs control of feeding forward the AC voltage Vsp. However, in the case where the AC side of the power converter 1 is connected to another AC circuit, feedforward control of the AC voltage Vsp may not be performed.

It is noted that, within the scope of the present invention, the above embodiments may be freely combined with each other, or each of the above embodiments may be modified or abbreviated as appropriate.

The invention claimed is:
1. A power conversion system comprising:
   a power converter for performing power conversion between plural-phase AC and DC, the power converter including a plurality of legs each having a positive arm and a negative arm connected in series, with a connection point therebetween connected to each phase AC line, the plurality of legs being connected in parallel between positive and negative DC buses; and a control device for controlling the power converter, wherein each of the positive arm and the negative arm of each leg is composed of at least one converter cells connected in series and including: a series unit of a plurality of semiconductor switching elements connected in series to each other; and a DC capacitor connected in parallel to the series unit, a terminal of the semiconductor switching element being used as an output terminal, the control device includes a voltage command generating unit for generating a first voltage command for the positive arm and a second voltage command for the negative arm, to perform output control for each converter cell in the positive arm and the negative arm, and the voltage command generating unit includes:
- a current control unit for calculating control commands for controlling an AC current component flowing through each phase AC line, and a circulating current component for each phase which circulates between the legs; and
- a command distributing unit for, on the basis of the control commands and a DC voltage command value for voltage between the DC buses, subtracting voltage drop portions due to inductance values in the positive arm and the negative arm from voltages assigned as outputs of the positive arm and the negative arm, to determine the first voltage command and the second voltage command.

2. The power conversion system according to claim 1, wherein
each phase AC line is connected to an AC circuit, and
the voltage command generating unit generates the first voltage command for the positive arm and the second voltage command for the negative arm, using each phase voltage of the AC circuit as a feedforward component.

3. The power conversion system according to claim 1, wherein
the control commands calculated by the current control unit includes: a first control command calculated so that AC current flowing through each phase AC line becomes close to an AC current command; and a second control command calculated so that circulating current for each phase which circulates between the legs becomes close to a circulating current command.

4. The power conversion system according to claim 1, wherein
the control commands calculated by the current control unit includes a third control command and a fourth control command calculated so that arm currents respectively flowing through the positive arm and the negative arm of each leg become close to respective set current commands, and
the current control unit controls the arm currents, thereby controlling the AC current component and the circulating current component.

5. The power conversion system according to claim 1, wherein
a reactor is provided in series in at least one of the positive arm and the negative arm of each leg.

6. The power conversion system according to claim 5, wherein
the command distributing unit uses an inductance of the provided reactor as the inductance values for calculation of the first voltage command and the second voltage command.

7. The power conversion system according to claim 5, wherein
the reactor is provided in series only in the negative arm of each leg.

8. The power conversion system according to claim 7, wherein
the reactor is provided on a negative side of the converter cell in the negative arm.

9. The power conversion system according to claim 5, wherein
the reactors having inductances equal to each other are provided in series in both the positive arm and the negative arm of each leg.

10. The power conversion system according to claim 1, wherein
the voltage command generating unit generates a modulation index correcting signal on the basis of voltage of the DC capacitor in each converter cell, and corrects the first voltage command and the second voltage command from the command distributing unit by dividing the first voltage command and the second voltage command by the modulation index correcting signal.

11. The power conversion system according to claim 1, wherein
the voltage drop portions are due to inductance values from which a parallel inductance value of the positive arm and the negative arm has been removed.

* * * * *